United States Patent [19]

Hackett et al.

[11] Patent Number: 4,704,429

[45] Date of Patent: * Nov. 3, 1987

[54] FLOOR POLISHES PARTICULARLY RECEPTIVE TO HIGH SPEED AND VERY HIGH SPEED SPRAY OR DRY BUFFING

[75] Inventors: Walter Hackett, Westminster; Peter E. Galena, Huntington Beach, both of Calif.

[73] Assignee: Turco Purex Industrial Corp., Lakewood, Calif.

[*] Notice: The portion of the term of this patent subsequent to Nov. 8, 2000 has been disclaimed.

[21] Appl. No.: 642,178

[22] Filed: Aug. 20, 1984

Related U.S. Application Data

[60] Division of Ser. No. 548,629, Nov. 4, 1983, Pat. No. 4,526,815, which is a continuation-in-part of Ser. No. 319,634, Nov. 9, 1981, Pat. No. 4,414,360, which is a division of Ser. No. 253,300, Apr. 3, 1981, Pat. No. 4,363,235.

[51] Int. Cl.$^4$ .................................................. C08J 3/24
[52] U.S. Cl. .................................... 524/560; 106/10; 524/562; 524/563; 525/162; 525/163; 525/501; 525/512
[58] Field of Search ............... 106/3, 10; 524/560, 524/561, 562, 563; 525/102, 162, 501, 512, 163

[56] References Cited

U.S. PATENT DOCUMENTS

| | | | |
|---|---|---|---|
| 3,245,932 | 4/1966 | Glavis et al. | 525/162 |
| 3,428,479 | 2/1969 | Dobransky | 525/162 |
| 3,579,610 | 5/1971 | Petropoulos et al. | 525/162 |
| 3,657,171 | 4/1972 | White | 524/272 |
| 3,717,599 | 2/1973 | Miyata | 106/14.36 |
| 3,723,376 | 3/1973 | Steinhayer et al. | 524/236 |
| 3,901,836 | 8/1975 | Kader | 106/14.12 |
| 3,926,888 | 12/1975 | Cheung et al. | 524/512 |
| 4,414,360 | 11/1983 | Hackett et al. | 524/560 |

FOREIGN PATENT DOCUMENTS

| | | |
|---|---|---|
| 1120250 | 3/1982 | Canada . |
| 1370204 | 11/1971 | United Kingdom . |
| 1338142 | 11/1973 | United Kingdom . |

OTHER PUBLICATIONS

Derwent Abstract Accession #84-071835/12, Japanese Patent J59026138-A, Aug. 6, 1982.
Derwent Abstract Accession #84-026866/05, Japanese Patent No. J58217568-A, Jun. 11, 1982.
Derwent Abstract Accession #82-62409E/20, Japanese Patent No. J57098576-A, Dec. 12, 1980.
Derwent Abstract Accession #81-24406D/14, Japanese Patent No. J56014569-A, Jul. 12, 1979.

Primary Examiner—Amelia B. Yarbrough
Attorney, Agent, or Firm—William W. Haefliger

[57] ABSTRACT

The method of producing a toughened, mar-resistant floor film includes the steps:
(a) applying to the floor surface a polish containing a cross-linking agent selected from the group that consists essentially of methylated melamine and sodium benzoate, and
(b) dry buffing said surface to heat the polish and surface and produce cross-linking of the cross-linking agent within the film and with the floor surface.

6 Claims, 4 Drawing Figures

FLOOR POLISHES PARTICULARLY RECEPTIVE TO HIGH SPEED AND VERY HIGH SPEED SPRAY OR DRY BUFFING

BACKGROUND OF THE INVENTION

This is a division of application Ser. No. 548,629, filed Nov. 4, 1983, now U.S. Pat. No. 4,526,815, which is a continuation-in-part of application Ser. No. 319,634, filed Nov. 9, 1981, now U.S. Pat. No. 4,414,360 which is a division of Ser. No. 253,300, filed Apr. 3, 1981, now U.S. Pat. No. 4,363,235.

This invention relates generally to treatment of polished and unpolished floor surfaces, and more particularly concerns the production of an improved film surface on floors.

There is continuing need for mar-resistant, tough, floor film surfaces produced as by buffing and characterized by extension of in-service life coupled with reduction in the frequency of required dry buffing, spray buffing or polish application (as compared to conventional polishes and spray buffing products).

In conventional floor polishing, metallized, as for example zinc, cross-linking occurs during the drying stages of the film, or shortly thereafter; however, once such cross-linking takes place, it cannot be altered or aided until stripping of the film, as for example when zinc-derived cross-linking is broken down by the presence of ammonia or amine in the stripping solution. Until the advent of the invention disclosed in U.S. Pat. No. 4,363,835, it was not possible to increase or induce further cross-linking in an already dried and trafficked film.

The invention disclosed in U.S. Pat. No. 4,363,835 concerns the incorporation of a non-metallic cross-linking ingredient (i.e., methylated melamine or sodium benzoate) into a composition sprayed onto a floor surface (in-service film, for example) and then spray buffed into the film to dryness, the heat generated by wet buffing inducing cross-linking within the film via oxygen bridging, thereby to toughen the film.

SUMMARY OF THE INVENTION

It is a major object of the present invention to incorporate the non-metallic cross-linking agent (methylated melamine or sodium benzoate) directly into a floor polish to induce cross-linking in response to dry or wet buffing. Cross-linking is achieved in the in-service film by virtue of the presence of the cross-linker in the polish product and frictional heat derived from the power driven floor cleaning and polishing pad. Ultra high speed, or high speed buffing produces the beneficial effects described below faster than conventional speed buffing units and procedures, but the composition gives improved benefits, even while using conventional procedures. An overall benefit is the extension of the service life of the in-service film coupled with overall improved performance during its life and a reduction in the frequency of needed wet or dry buffings. Polishing of uncoated resilient as well as non-resilient floor surfaces, e.g., vinyl asbestos, vinyl, asphalt, rubber, linoleum, and in the masonry family terrazzo, marble, clays, etc., is also possible with the invention. Observed improvements as regards improved performance and extension of service life compared to films not containing the subject cross-linking agents are listed as follows:

(a) film toughening as evidenced by improved scuff and scratch resistance,
(b) improved detergent and water resistance
(c) improved powdering resistance
(d) improved heel mark resistance
(e) improved overall gloss In addition, it is found that it is possible to overcoat the buffed film of the invention with additional coats of floor finish, thereby upgrading gloss still further, but more importantly thereby providing fresh cross-linking sites on the floor.

The described polish composition contains polymeric ingredients in the family of floor finish ingredients. The preferred non-metallic cross-linking agents may also be incorporated into other basic types of polishes, water-emulsion, wax-based products, with and without solvent fractions.

It is a further object of the invention to provide for the spray application onto the buffed film, derived from the polish, of a liquid solution containing additional non-metallic cross-linking ingredient, and buffing the polished floor surface with the sprayed-on solution thereon, to produce still further cross-linking with the film surface, as disclosed in U.S. Pat. No. 4,313,835.

These and other objects and advantages of the invention, as well as the details of an illustrative embodiment, will be more fully understood from the following description and drawings, in which:

DRAWING DESCRIPTION

DETAILED DESCRIPTION

Figure 1:
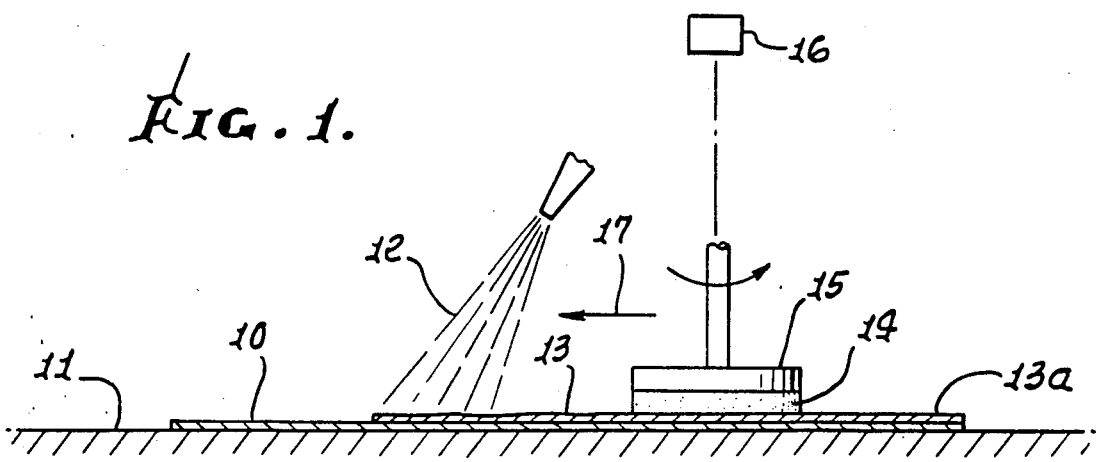
FIG. 1 is an elevation showing spray buffing of an applied formulation, in accordance with the invention.

Referring first to FIG. 1, and as described in U.S. Pat. No. 4,363,835, a layer of in-service floor finish 10 is shown on floor 11, layer 10 for example consisting of a conventional polished finish such as polymeric finish or floor wax, which was previously applied to the floor. In order to produce the tough, and more mar-resistant floor film, in accordance with the invention, a liquid solution is applied to the layer 10, as by spraying the solution downwardly into the air, as at 12, above the layer 10, so that solution droplets collect on the layer 10 as at 13. The solution contains an ingredient capable of producing cross-linking (as by oxygen group bridging) of layer 10, and in instances of uncoated flooring the surface at 11, in response to heat produced as a result of high speed buffing of the solution droplets on layer 10 or surface 11. Such heat is produced by frictional rubbing of the abrasive or non-abrasive buffing pad 14 on layer 10 to which the solution droplets have been applied, as by spraying. A rotor carrying the pad is indicated at 15, and the high speed rotary drive for the rotor is indicated at 16. As the rotor is rotated, it is traveled over the droplet area, as shown by arrow 17. Pad 14 typically consists of non-woven fiber and resinous binder in which abrasive particles may or may not be distributed, and having exposed edges that rub against the solid surfaces layer 10 to produce heat as the rotor rotates, as for example at speeds of and in excess of 1,000 rpm. The resultant tough film is shown at 13a, cross-linked with layer 10.

The liquid solution ranging in total solids from 2% to 40% consists essentially of:

| Ingredient | Range of wt percent | Preferred wt. percent |
| --- | --- | --- |
| (a) water emulsion acrylic, styrene acrylic, vinyl acetate-acrylic, etc. polymer (typically at 34-36%) | 5.0-90.0% | about 39% |
| (b) water soluble solvent | 0.5-6.0% | about 4% |
| (c) non-ionic surfactant | 0.1-2.0% | about 1% |
| (d) volatile amine | 0.1-3.0% | about 1% |
| (e) humectant | 0.1-4.0% | about 2% |
| (f) cross-linking agent selected from group that includes methylated melamine and sodium benzoate | 0.1-10.0% | 1.5-4.0% |
| (g) ammonia | 0.1-2.0% | about 1% |
| (h) water | balance | balance |
| Optional Ingredients | | |
| (i) anionic or nonionic wax or polyolefin emulsion at typical solids of 16.0% or polyethylene latex, e.g., Poly-Ems. | 0-16% | about 6% |
| (j) Resin Fractions-solubilized at typical solids of 16% Rosin-based resins Styrene maleic anhydrides Styrene acrylic acid resins Pentaerythritol-based resins Alkyd based resins | 0-25% | about 10% |

Among suitable wax and polyolefin materials are waxes and mixtures of waxes of vegetable, animal or synthetic origin including carnauba, candelilla, montan, lanolin, cocoa butter, cottonseed, stearin, Japan, bayberry, myrtle, mace, palm kernel, beeswax, spermaceti, Chinese insect, tallow among the natural waxes and Fischer-Tropsch and hydrogenated coconut and soybean oil waxes among the synthetic waxes, as well as emulsifiable polyolefin waxes, particularly of olefin monomers having 2 or 3 carbon atoms, i.e. ethylene and propylene in major proportion. Ethylene-and propylene-acid copolymers are also suitable, as are paraffin and microcrystalline waxes, both oxidized and unoxidized, ceresin and ozokerite waxes.

"Waxes" include polyolefins of low, medium and high molecular weight which are emulsifiable e.g. from waxes to high polymers or are supplied as latexes, etc. Poly-Em products.

Suitable resin fractions are identified in (j) above.

If the cross-linking agent is methylated melamine, its weight percent is typically about 4.0; whereas if the cross-linking agent is sodium benzoate, its weight percent is typically about 1.5. Further, the solution preferably also includes a small amount of ammonia, i.e. about 0.60 weight percent when the cross-linking agent consists of the melamine, and about 0.25 when the cross-linking agent consists of sodium benzoate. In either case, the water soluble solvent preferably consists of glycol ether; the surfactant preferably consists of nonylphenoxy poly-(ethyleneoxy) ethanol; the volatile amine preferably consists of 2-Amino, 2-Methyl Propanol-1, and the humectant preferably consists of ethylene glycol. Cross-linking between oxygen groups such as OH$^-$ and COOH$^-$ is believed to occur at buffing temperatures in excess of 120° F., and preferably in excess of 150° F., i.e. 170°-180° F.

The ingredients and their functions in the solution composition are listed as follows:

| Ingredient | Function |
| --- | --- |
| 1. Water | (a) Carrier |
| | (b) Diluent |
| | (c) Lesser cleaning agent |
| | (d) Lubricant |
| 2. Plasticized or non-plasticized water-emulsion styrene polymers or copolymers of styrene-acrylate-methacrylic acid or acrylate-methacrylic acid or vinyl acetate-acrylate-methacrylic acid-all with or without zinc salt, or polish products built around the above polymers (Where practical acrylic acid can also be substituted for the methacrylic acid shown above) | (a) Film forming agent (b) Supplier of fresh cross linking sites in film |
| 3. Surfactant | Cleaning agent |
| 4. Ammonia | (a) Cleaning agent (b) May serve also to "decross-link" the zinc cross linked carboxyls in the in-service film thereby freeing up acid groups for cross-linking with the melamine cross-linking agent |
| 5. Amine | (a) As in 4a and 4b (b) Catalyst and stabilizer for melamine ingredient |
| 6. Humectant, e.g., ethylene glycol | (a) Film emollient (b) Film moisturizer (c) Lesser cleaning agent |
| 7. Water soluble solvent e.g., glycol ethers | (a) Coalescing agent for polymer (b) Penetrating agent component (into in-service film) (c) Lesser cleaning agent (d) Cosolvent for cross-linking agent |
| 8. Cross-linking agent | (a) As disclosed herein |
| Optional Ingredients | |
| 9. Anionic or nonionic wax or polyolefin emulsion or polyolefin latex, e.g., Poly-Ems | (a) Aid to buffing ease (b) Lubricant (c) Supplier of fresh cross-linking sites |
| 10. Resin solutions | (a) Gloss contributor (b) Film forming agent (c) Supplier of fresh cross-linking sites |

Specific formula examples are listed as follows: (Examples 1 and 2 being preferred)

EXAMPLE 1

| Ingredient | wt. percent |
| --- | --- |
| PM-833 polymer (a product of Purex Corporation)[1] | 39.00 |
| Dipropylene glycol monomethyl ether (Ucar 2LM) | 4.00 |
| Nonylphenoxy poly-(ethyleneoxy) ethanol (Igepal CO 630) | 1.00 |
| 2-Amino, 2-Methyl Propanol-1 (AMP) | 1.00 |
| Ethylene glycol | 2.00 |
| Methylated melamine | 4.00 |
| Dye | 0.2 g/gal. |
| Formaldehyde (Preservative) | 0.05 |
| Aqua Ammonia | 0.60 |
| Soft water | Balance |

[1] Water emulsion, zinc-containing, styrene-acrylate-methacrylic acid copolymer.

EXAMPLE 2

| Ingredient | wt. percent |
|---|---|
| PM-292 polymer a water-emulsion, styrene-acrylate-methacrylic acid copolymer with no zinc component, produced by Purex Corporation Carson, California | 38.06 |
| Sodium benzoate | 1.54 |
| Dipropylene glycol monomethyl ether (Ucar 2LM) | 4.12 |
| Igepal CO 630 | 1.30 |
| 2-Amino, 2-Methyl-Propanol-1 (AMP) | 1.03 |
| Ethylene glycol | 2.06 |
| Aqua Ammonia | 0.25 |
| Soft water | balance |

EXAMPLES 3 AND 4

| | wt. percent | |
|---|---|---|
| Ingredient | Ext. 3 | Ext. 4 |
| PM-292 polymer | 36.96 | 36.96 |
| Ucar 2LM | 3.89 | 3.89 |
| Igepal CO 630 | 1.00 | 1.00 |
| AMP | 1.00 | 1.00 |
| Dibutyl phthalate (plasticizer) | 1.00 | 1.00 |
| Ethylene glycol | 2.00 | 2.00 |
| Methylated melamine | 3.89 | 3.89 |
| Sodium benzoate | 0.50 | — |
| Aqua Ammonia | 0.24 | 0.24 |
| Poly-Em 40 | — | 4.75 |
| Soft water | balance | balance |

EXAMPLE 5

| Ingredient | wt. percent |
|---|---|
| PM-833 polymer | 44.95 |
| Ucar 2LM | 4.00 |
| Igepal CO 630 | 1.00 |
| AMP | 1.00 |
| Ethylene glycol | 2.00 |
| Sodium benzoate | 1.50 |
| Soft water | balance |

Figure 2:
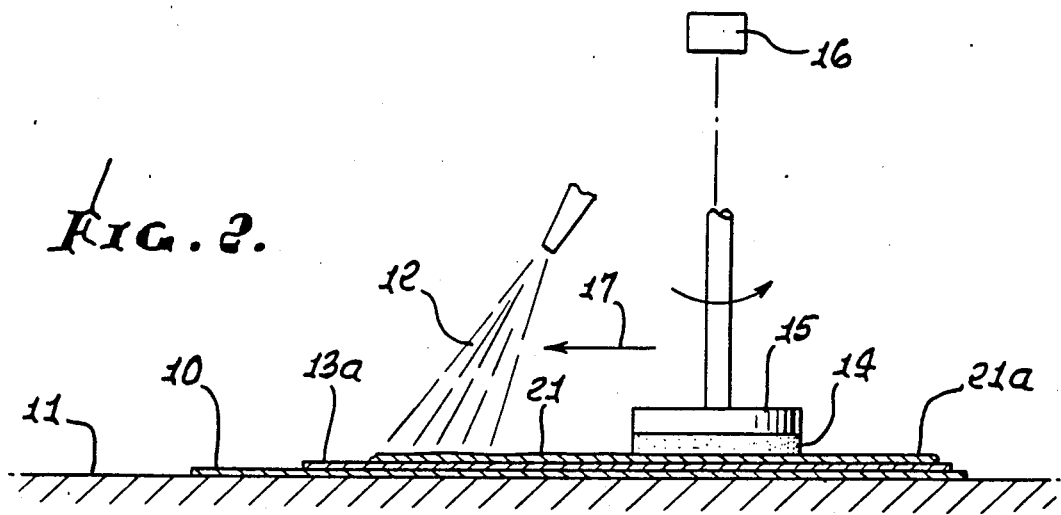
FIGS. 2-4 are further views like FIG. 1.

FIG. 2 is the same as FIG. 1, except that a second application of solution 21 is shown as sprayed on completed film 13a, as referred to above. The collected droplets of solution 21 are buffed in the same manner as described above, to produce a tough film 21a cross-linked with film 13a, wherein 13a is further cross-linked. Solution 21 consists of any of the described formulas.

Figure 3:
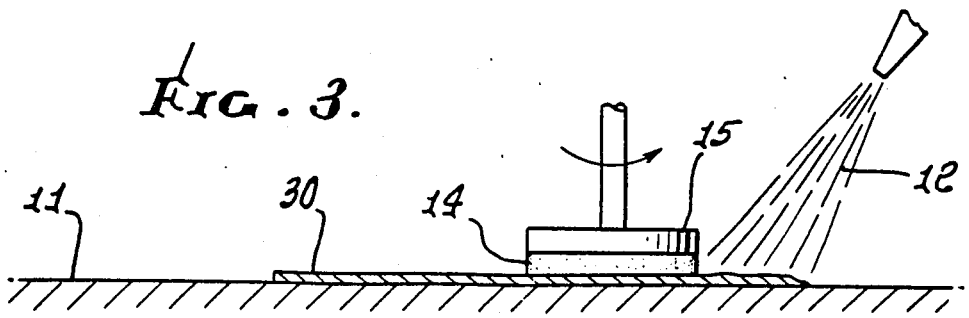

As an alternative and in accordance with the present invention, the non-metallic cross-linking agent is incorporated into polish applied (as by rubbing or spreading) onto a floor surface, and after drying is buffed at high speed, or very high speed to produce non-metallic cross-linking of the agent within the ingredients of the polish film. Layer 30 in FIG. 3 on surface 11, may represent such a polish application on surface 11, to be buffed by rotary pad 14, prior to possible subsequent after-traffic application of the spray 12 and buffing as described above, as in FIg. 1. Thus, spray application in many cases is not required, buffing of the polish layer alone being sufficient to produce the desired cross-linked, mar and scuff resistance improved surface. The resultant surface also has superior film gloss, particularly as to depth of gloss (clarity of reflected image) and better resistance to water when compared with prior film not having non-metallic cross-linking agent (as for example Morton AA-417-A-1, Rohm & Haas N-24-1, or Franklin TRIPLE LIFE).

Figure 4:
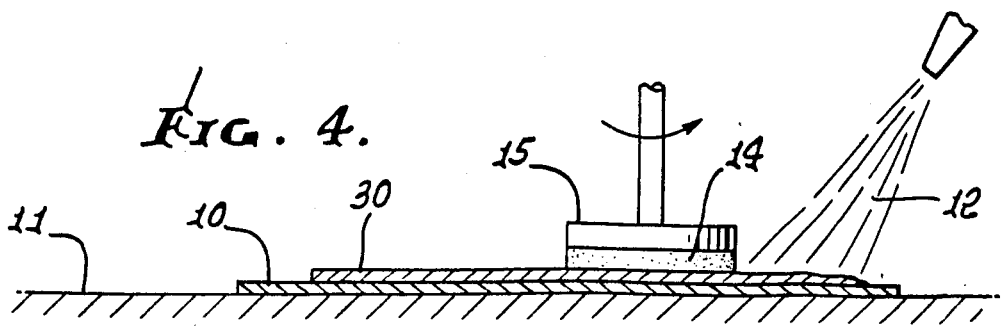

As a further alternative, a layer 30 of polish containing the non-metallic cross-linking agent may be applied onto a previous applied layer 10 of a conventional polish finish such as polymeric finish or floor wax. The layer 30 of polish containing the cross-linking agent is then buffed at high rotary speed, as by rotary pad 14, to produce the desired mar and scuff resistant surface. See FIG. 4. Subsequently, it may be desirable to apply spray 12, and buff, as described above.

Representative formulations of polishes containing the non-metallic cross-linking agents are identified in the following table, in which formulas with numbers ending in "B, C and D" contain these added cross-linking agents (sodium benzoate, or melamine, or a combination thereof) and formulas with numbers ending in "A" contain no such cross-linking agents.

TABLE I

2072/40A: Morton's Formula AA-417-A-1 (No cross-linkers other than zinc)
2072/40B: Morton's Formula AA-417-A-1 + Sodium benzoate
2072/40C: Morton's Formula AA-417-A-1 + Melamine
2072/40D: Morton's Formula AA-417-A-1 + 50/50 Sodium benzoate/melamine
2072/41A: Rohm & Haas Formula N-24-1 (No cross-linkers other than zinc)
2072/41B: Rohm & Haas Formula N-24-1 + Sodium benzoate
2072/41C: Rohm & Haas Formula N-24-1 + Melamine
2072/41D: Rohm & Haas Formula N-24-1 + 50/50 Sodium benzoate/melamine
2072/42A: Triple Life P-7616 No zinc, no cross-linker
2072/42B: Triple Life P-7616 + Sodium benzoate
2072/42C: Triple Life P-7616 + Melamine
2072/42D: Triple Life P-7616 + 50/50 Sodium benzoate/melamine The polymer based formulas so identified are listed as follows, wherein the recited percentages are weight percents:

| MORTON ILLUSTRATIVE FORMULA AA-417-A-1 (With and Without Non-Metallic Cross-Linkers) | | | | |
|---|---|---|---|---|
| #2072/40 | A | B | C | D |
| SMA Resin @ 15% | 15.00% | 15.00% | 15.00% | 15.00% |
| Tributoxyethyl Phosphate | 0.50 | 0.50 | 0.50 | 0.50 |
| 2-Pyrrolidone | 1.00 | 1.00 | 1.00 | 1.00 |
| Carbitol | 1.00 | 1.00 | 1.00 | 1.00 |
| Diethylene Glycol | 1.00 | 1.00 | 1.00 | 1.00 |
| FC-134 @ 1% | 0.25 | 0.25 | 0.25 | 0.25 |
| Formaldehyde | 0.10 | 0.10 | 0.10 | 0.10 |
| Morton AA-417 | 28.20 | 28.20 | 28.20 | 28.20 |
| Epoline E-10 Emul. 30% | 5.00 | 5.00 | 5.00 | 5.00 |
| Sodium Benzoate | — | 1.00 | — | 0.50 |
| Hexamethoxymethyl-melamine | — | — | 1.00 | 0.50 |
| Soft Water | 47.95 | 46.95 | 46.95 | 46.95 |
| | 100.00% | 100.00% | 100.00% | 100.00% |

| ROHM & HAAS ILLUSTRATIVE FORMULA N-24-1 (With and Without Non-Metallic Cross-Linkers) | | | | |
|---|---|---|---|---|
| #2072/41 | A | B | C | D |
| Conrez @ 40%* | 1.87% | 1.87% | 1.87% | 1.87% |
| Tributoxyethyl Phosphate | 1.00 | 1.00 | 1.00 | 1.00 |
| Ethylene Glycol | 4.00 | 4.00 | 4.00 | 4.00 |
| Dibutyl Phthalate | 1.00 | 1.00 | 1.00 | 1.00 |

ROHM & HAAS ILLUSTRATIVE FORMULA N-24-1
(With and Without Non-Metallic Cross-Linkers) -continued

| #2072/41 | A | B | C | D |
|---|---|---|---|---|
| FC-129 @ 1% | 0.40 | 0.40 | 0.40 | 0.40 |
| Formaldehyde | 0.15 | 0.15 | 0.15 | 0.15 |
| Rhoplex B-924 | 31.58 | 31.58 | 31.58 | 31.58 |
| Poly EM-40 | 5.63 | 5.63 | 5.63 | 5.63 |
| Sodium Benzoate | — | 1.00 | — | 0.50 |
| Hexamethoxymethyl-melamine | — | — | 1.00 | 0.50 |
| Soft Water | 54.37 | 53.37 | 53.37 | 53.37 |
| | 100.00% | 100.0% | 100.00% | 100.00% |

*MORTON CHEMICAL

PUREX FORMULA WHICH DOES NOT CONTAIN ZINC
(With and Without Non-Metallic Cross-Linkers)

| #2072/42 | A | B | C | D |
|---|---|---|---|---|
| SMA Resin @ 15% | 13.80% | 13.80% | 13.80% | 13.80% |
| Tributoxyethyl Phosphate | 1.20 | 1.20 | 1.20 | 1.20 |
| n-Methyl 2-Pyrrolidone | 1.00 | 1.00 | 1.00 | 1.00 |
| FC-128 @ 1% | 1.00 | 1.00 | 1.00 | 1.00 |
| Formaldehyde | 0.10 | 0.10 | 0.10 | 0.10 |
| PM 292 Styrene Acrylic Copolymer @ 40% | 22.50 | 22.50 | 22.50 | 22.50 |
| Epolene E-10 Emul @ 30% | 9.90 | 9.90 | 9.90 | 9.90 |
| Sodium Benzoate | — | 1.00 | — | 0.50 |
| Hexamethoxymethyl-melamine | — | — | 1.00 | 0.50 |
| Soft Water | 50.50 | 49.50 | 49.50 | 49.50 |

PUREX FORMULA WHICH DOES NOT CONTAIN ZINC
(With and Without Non-Metallic Cross-Linkers) -continued

| #2072/42 | A | B | C | D |
|---|---|---|---|---|
| | 100.00% | 100.00% | 100.00% | 100.00% |

*Purex Industries Inc. polymer that contains no metal ions

In the above formula series 2072/42, there is no metallic, as for example zinc, ion; however, in the formula series 2072/40 the MORTON AA-417 contains zinc ion, and in 2072/41 the RHOPLEX B-924 contains zinc ion.

In further testing, it is found that the weight percentage of cross-linking agent or agents should be at least about 0.5% and no greater than about 3.0%. The best level is about 1.0%, for optimum results.

Test results, in terms of leveling, scuff resistance, slip resistance, water resistance, powdering and film gloss, with respect to the above formulations, are as shown in TABLE II:

TABLE II
Performance Evaluation of Polishes-With and Without Non-Metallic Cross-Linking Agents
Performance Ratings *After Dry High Speed Buffing With a White Polishing Pad

| Product | Contains Non-Metallic Cross-Linking Agents | Scuff Resistance | Scratch Resistance | Water Resistance | 60° Gloss After Dry High Speed Buffing | Depth of Gloss Rating After Dry High Speed Buffing | Leveling | Powdering @ 75° F. (unbuffed) | 1 Week 125° F. |
|---|---|---|---|---|---|---|---|---|---|
| #2072 | | | | | | | | | |
| /40A | No | Excellent | Excellent | Recovers in 15-20 mins. | 58/60/61/62 | Excellent | Excellent | None | OK |
| /40B | Yes | Superior | Excellent+ | Recovers in 15-20 mins. | 74/74/70/69 | Superior | Excellent | None | OK |
| /40C | Yes | Superior | Superior | Immediate recovery | 69/71/74/74 | Superior | Excellent | None | OK |
| /40D | Yes | Superior | Superior | Immediate recovery | 72/72/68/70 | Superior | Excellent | None | OK |
| #2072 | | | | | | | | | |
| /41A | No | Excellent | Good | Recovers in 15-20 mins. | 84/84/83/84 | Superior | Excellent | None | OK |
| /41B | Yes | Superior | Very Good | Recovers in 15-20 mins. | 86/86/86/87 | Outstanding | Excellent | None | OK |
| /41C | Yes | Superior | Very Good | Immediate recovery | 85/85/84/84 | Outstanding | Excellent | None | OK |
| /41D | Yes | Superior | Very Good | Immediate recovery | 85/84/87/87 | Outstanding | Excellent | None | OK |
| #2072 | | | | | | | | | |
| /42A | No | Excellent | Excellent | Requires light buffing after 15-20 mins. to recover | 75/78/76/76 | Excellent+ | Excellent | Trace | OK |
| /42B | Yes | Superior | Excellent | Recovers in 15-20 mins. | 78/77/76/75 | Superior | Excellent | None | OK |
| /42C | Yes | Superior | Excellent | Recovers in 15-20 mins. | 78/78/80/80 | Superior | Excellent | None | OK |
| /42D | Yes | Superior | Excellent | Recovers in 15-20 mins. | 77/77/80/76 | Superior | Excellent | None | OK |

*Performance Rankings
Outstanding = Best
Superior
Excellent
Very Good
Good = Worst
**All films showed slight whitening upon removal of a water drop from the surface. Whitening disappeared (recovered) after the indicated times or treatments, e.g., light buffing.

Finally, the presence of the methylated melamine or sodium benzoate ingredients in a floor polish film produces flash cross-linking of the film to the substrate or floor surface as a result of the high frictional heat of the ultra high speed buffing (1,500-2,400 RPM), or high speed buffing (1,000-1,500 RPM), whereby superior adherence of the film to the substrate is produced. The film is rendered ultra-high speed buffable without unwanted removal from the substrate by tearing, powdering or burnoff during such high speed buffing. Floor polish films containing the non-metallic cross-linking agent can subsequently be ultra-high speed dry buffed in unusually short periods of time follownig application, i.e., after as little as 30-45 minutes following application, with no powdering, or at most, minimum powdering.

We claim:

1. A floor polish containing a polymer of waxy film forming agent and a cross-linking ingredient for use in producing a toughened, mar-resistant floor film as by application to an uncoated floor surface or to an already formed floor surface film and buffing of the floor surface film with the polish thereon to heat the polish and surface film and produce cross-linking with the film surface, said polish containing between about 0.5 and 3.0 weight percent of said cross-linking ingredient selected from the group consisting of sodium benzoate and methylated melamine, said polish adjacent a floor surface and cross-linked with said surface, said cross-linking defined by oxygen group bridging, said polish consisting essentially of:

| Ingredient | Range of wt. percent |
| --- | --- |
| (a) water emulsion acrylic styrene acrylic, vinyl | 5.0-90.0% |

| Ingredient | Range of wt. percent |
| --- | --- |
| acetate-acrylic | |
| (b) water soluble solvent | 0.5-6.0% |
| (c) non-ionic surfactant | 0.1-2.0% |
| (d) volatile amine | 0.1-3.0% |
| (e) humectant | 0.1-4.0% |
| (f) cross-linking agent selected from group that includes methylated melamine and sodium benzoate | .5-3.0% |
| (g) ammonia | 0.1-2.0 |
| (h) water | balance |

2. The polish of claim 1 wherein the weight percentage of said cross-linking ingredient is about 1.0%.

3. The polish of claim 1 which is wax based.

4. The polish of claim 1 which is polymer based.

5. The polish of claim 1 wherein said cross-linking ingredient consists of sodium benzoate, which constitutes between 0.5 and 1.0 weight percent of the composition.

6. The polish of claim 1 wherein said cross-linking ingredient consists of methylated melamine, which constitutes between about 0.5 and 1.0 weight percent of the composition.

* * * * *